US012394916B2

(12) United States Patent
Bobbitt et al.

(10) Patent No.: US 12,394,916 B2
(45) Date of Patent: Aug. 19, 2025

(54) FOOD AND BEVERAGE PIPE BONDING MECHANICAL JUMPER KIT

(71) Applicant: ABB Schweiz AG, Baden (CH)

(72) Inventors: Dustin Bobbitt, Memphis, TN (US); Joseph Ferris, Memphis, TN (US)

(73) Assignee: ABB SCHWEIZ AG, Baden (CH)

( * ) Notice: Subject to any disclaimer, the term of this patent is extended or adjusted under 35 U.S.C. 154(b) by 366 days.

(21) Appl. No.: 18/184,632

(22) Filed: Mar. 15, 2023

(65) Prior Publication Data

US 2024/0313436 A1 Sep. 19, 2024

(51) Int. Cl.
*H01R 4/36* (2006.01)
*H01R 4/30* (2006.01)

(52) U.S. Cl.
CPC ............... *H01R 4/36* (2013.01); *H01R 4/302* (2013.01)

(58) Field of Classification Search
CPC . H01R 4/38; H01R 4/36; H01R 4/302; H01R 4/30
USPC .................................................. 439/814, 810
See application file for complete search history.

(56) References Cited

U.S. PATENT DOCUMENTS

| | | | | | |
|---|---|---|---|---|---|
| 2,399,899 | A | | 5/1946 | Tinnerman | |
| 5,314,343 | A | | 5/1994 | Englander | |
| 5,772,455 | A | * | 6/1998 | Auclair | H01R 4/42 439/100 |
| 6,727,430 | B1 | | 4/2004 | Franks, Jr. | |
| 2013/0047409 | A1 | | 2/2013 | Booth | |
| 2015/0099405 | A1 | * | 4/2015 | Dahl | H01R 4/36 439/814 |
| 2021/0278014 | A1 | | 9/2021 | Bendlak et al. | |

* cited by examiner

*Primary Examiner* — Tulsidas C Patel
*Assistant Examiner* — Jeffrey Mountain
(74) *Attorney, Agent, or Firm* — Greenberg Traurig, LLP

(57) ABSTRACT

A device includes a tensioning member including a head portion and a cylindrical portion. The head portion includes a first bore and a second bore in communication with the first bore. The cylindrical portion extends from the head portion towards a second end and includes one or more threads. A device may include a set screw member including threads formed along its length. The set screw member may couple to the first bore and retains an electrical conductor positioned in the second bore in connected engagement with the tensioning member. The tensioning member is configured to contact an elongate article to electrically connect the elongate article to the tensioning member and the electrical conductor. A device may also include a strap member. The strap member extends around the elongate article and the tensioning member applies a tension force between the strap member and the elongate article.

20 Claims, 7 Drawing Sheets

FOOD AND BEVERAGE PIPE BONDING MECHANICAL JUMPER KIT

FIELD

The present disclosure relates to the field of transfer systems for conveying dry materials. More particularly, for food and beverage pipe bonding mechanical jumper kits.

BACKGROUND

In the food and beverage manufacturing process, pipes or conduits form part of the distribution system that is used to convey dry or liquid materials from a source to a destination. For sanitation purposes, these pipes are typically made of metal and may also be electrically conductive. Consequently, the friction caused by the material passing through the interior channel of the pipe can result in an electrical potential buildup at the pipe. Without proper electrical grounding protection, the electrical potential can discharge, thereby causing the material, such as flour, traveling through the metal pipe to ignite or combust. To prevent such occurrences, the elongate articles used in the food and beverage industry and other similar applications typically utilize grounding protection devices that are welded onto the metal pipe. Improved electrical grounding protection devices are desirable.

SUMMARY

In some embodiments, a device includes a tensioning member including a first end, a second end, a head portion, and a cylindrical portion. The head portion includes a first bore and a second bore. The first bore is in communication with the second bore. The cylindrical portion extends from the head portion towards the second end and includes one or more threads formed along a length of the cylindrical portion. The device includes a set screw member located in the first bore. The set screw member is configured to engage an electrical conductor located in the second bore to connect the tensioning member to the electrical conductor. The device includes a first nut located adjacent the second end of the tensioning member. The tensioning member extends through the first nut and the second end of the tensioning member is configured to contact a surface of an elongate article to electrically connect the elongate article to the tensioning member and the electrical conductor.

In some embodiments, the device further includes a strap member including a first flange, a second flange, and a central elongate portion. The first flange and the second flange extend from opposing ends of the central elongate portion. The central elongate portion is configured to substantially extend around a circumference of an elongate article until the first flange is in contact with the second flange along adjacent sides.

In some embodiments, a position of the tensioning member in the first nut is adjustable in a direction substantially perpendicular to a longitudinal axis of the elongate article to apply a tension force between the strap member and the elongate article.

In some embodiments, the strap member further includes a first aperture at the first flange, and a second aperture at the second flange. The tensioning member extends through the first aperture and the second aperture to retain the strap member around the elongate article.

In some embodiments, the strap member further includes a third aperture at the second flange adjacent the second aperture. The tensioning member is configured to extend through the first aperture and the third aperture to retain the strap member around the elongate article.

In some embodiments, the first nut is configured to extend into the first aperture and connect to the first flange by binding to the strap member through mechanical deformation in response to a clamping force applied to the first nut.

In some embodiments, the set screw member impinges on the electrical conductor to fixedly retain the electrical conductor in the second bore and to connect the tensioning member to the electrical conductor.

In some embodiments, the first bore extends from the first end of the tensioning member towards the second end. The second bore extends through the head portion in a direction substantially perpendicular to the first bore.

In some embodiments, the device further includes a second nut. The second nut is configured to thread onto the set screw member opposite the tensioning member and act upon the head portion of the tensioning member to retain a position of the set screw member in the first bore.

In some embodiments, an apparatus includes a strap member including a first flange, a second flange, and a central elongate portion. The apparatus includes a tensioning member including a head portion at a first end, a first bore located in the head portion, a second bore located in the head portion in communication with the first bore, and a cylindrical portion at a second end. The second bore being in communication with the first bore. The apparatus includes a set screw member located in the first bore, a first nut, and a second nut. The tensioning member extends through the first nut and the second end of the tensioning member is configured to contact a surface of an elongate article to electrically connect the elongate article to the tensioning member, and a position of the tensioning member in the first nut is adjustable in a direction substantially perpendicular to a longitudinal axis of the elongate article to apply a tension force between the strap member and the elongate article.

In some embodiments, the second bore extends through the head portion in a direction substantially perpendicular to the first bore, wherein the second bore is configured to receive an electrical conductor positioned in the second bore.

In some embodiments, the set screw member extends from the first bore into the second bore and impinges on the electrical conductor to fixedly retain the electrical conductor in the second bore and connect the tensioning member to the electrical conductor. The tensioning member is further configured to electrically connect the elongate article to the electrical conductor.

In some embodiments, the strap member further includes a first aperture at the first flange and a second aperture at the second flange. The central elongate portion is configured to substantially extend around a circumference of the elongate article until the first flange is in contact with the second flange along adjacent sides. The tensioning member is configured to extend through the first aperture and the second aperture to retain the strap member around the elongate article.

In some embodiments, the first nut is configured to extend into the first aperture and connect to the first flange by binding to the strap member through mechanical deformation in response to a clamping force applied to the first nut.

In some embodiments, the strap member further includes a third aperture at the second flange adjacent the second aperture. The tensioning member is configured to extend through the first aperture and the third aperture.

In some embodiments, the tensioning member is further configured to apply a tension force between the strap member and the elongate article.

In some embodiments, a jack bolt includes a body having a first end and a second end, the body including a head portion located at the first end, the head portion including a first bore and a second bore. The second bore extends through the head portion in a direction substantially perpendicular to the first bore and the second bore is in communication with the first bore. The jack bolt includes a cylindrical portion located at the second end. The cylindrical portion extends from the head portion to the second end and includes threads formed on a length of the cylindrical portion.

In some embodiments, the first bore extends from the first end towards the second end in the head portion. In some embodiments, the first bore includes threads formed on an inner surface of the first bore and the first bore is configured to receive a set screw member.

In some embodiments, the second bore is configured to receive an electrical conductor positioned in the second bore. In some embodiments, the set screw member is configured to extend from the first bore into the second bore and impinge on the electrical conductor to fixedly retain the electrical conductor in the second bore and to connect the jack bolt to the electrical conductor.

In some embodiments, the jack bolt includes electrically conductive metallic material. In some embodiments, the jack bolt includes dimensions capable of carrying at least 2,450 amps for a predetermined period of time.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
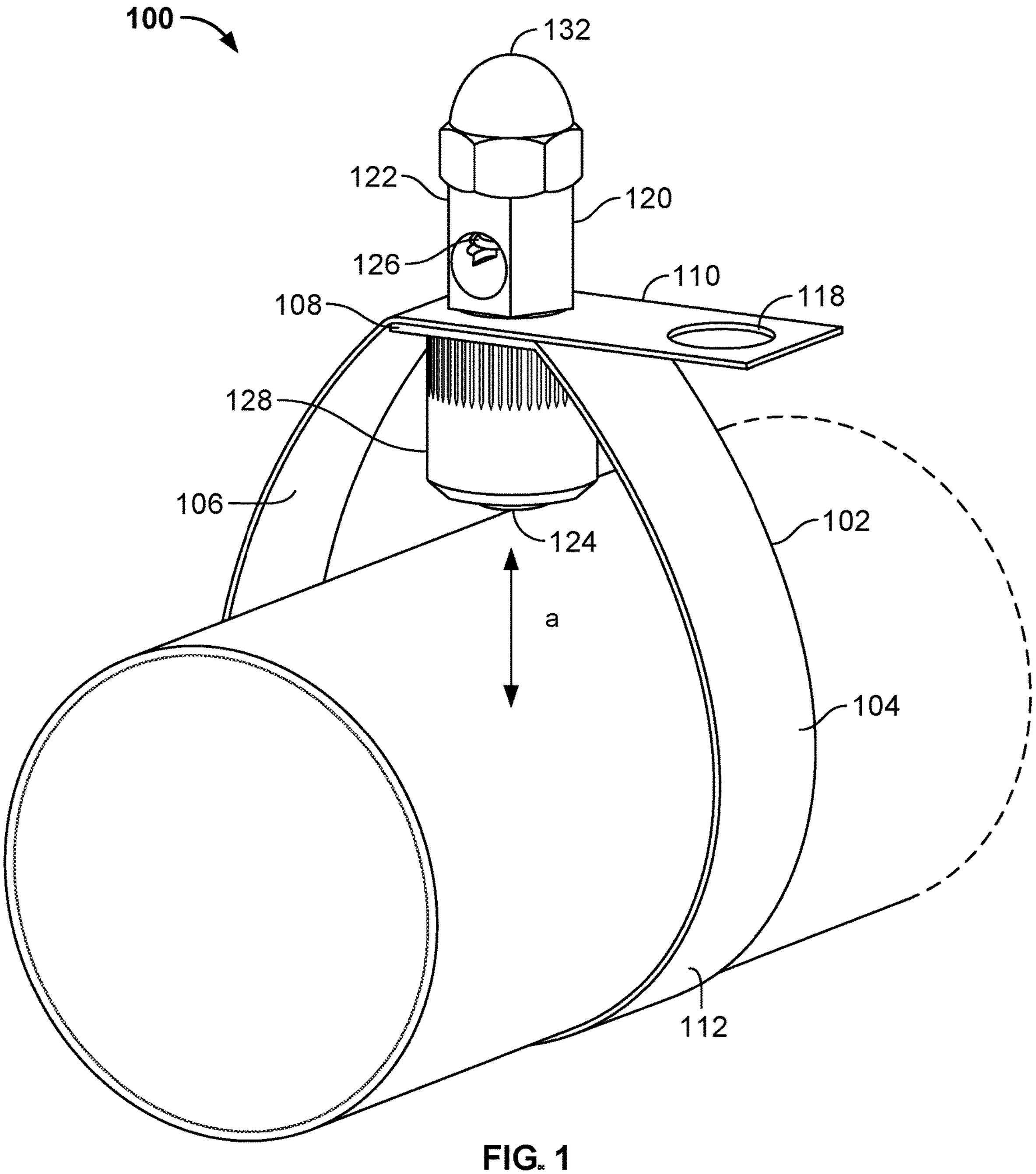
FIG. 1 depicts an example embodiment of a device, according to some embodiments.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

As material passes through the channel of an elongate article (e.g, metal pipe), the resulting friction may cause a buildup of an electrical discharge potential in the form of electric current at the elongate article. Without adequate grounding protection, the material passing through the elongate article can ignite or combust due to the discharge of the electrical potential, thereby potentially damaging equipment and/or causing injury to personnel. Conventional grounding methods include welding a stud onto an exterior surface of the elongate article and bolting a conductor (e.g., jumper, bonded jumper, etc.) onto the stud. However, this approach requires using specialized tools and equipment (e.g., welding tools) to weld the stud onto the pipe and also requires specialized permits to perform such work (e.g., hot work permits). As used herein, the term "pipe" refers to an elongated cylindrical conduit having one or more enclosed channels extending through the conduit and used for conveying material, such as a dry flowable material, from a source reservoir.

The present disclosure includes various embodiments of a device, apparatus, system, or kit that includes one or more components adapted for mechanically and electrically connecting to an electrically conductive elongate article. The article is a metal pipe. In some embodiments, the article may include a conduit, channel, or other elongate electrically conductive article used to convey materials through the article. Additionally, the device connects the article to one or more grounded electrical conductors, thereby providing grounding protection to the article. The device is adapted to flexibly extend around the article such that the article extends through a central cylindrical opening formed by the device and the device securely attaches to the article by applying a tension force onto the article extending through the opening. The device is also adapted to be installed onto the elongate article using only hand tools. For example, with a hex wrench or other driver tool. Accordingly, the device may be easily installed onto the article to provide electrical grounding protection without requiring welding tools or requiring permits to install the device onto the article. It is to be understood by those of ordinary skill in the art that the article may include any of a plurality of diameters and profiles suitable for conveying dry materials through an interior channel of the elongate article. Accordingly, it is also to be understood by those of ordinary skill in the art that the device as described herein in not intended to be limiting any may include any of a plurality of dimensions suitable for being installed onto the article to provide electrical grounding capabilities to the article.

In various embodiments, the device may be made substantially out of metallic materials suitable for providing grounding protection to the article by providing a discharge path for an electrical discharge potential that may build up at the article. In various embodiments, the device may be formed of metallic materials that are also corrosion resistant to prevent the buildup of rust on the device. For example, the device may be subject to a chemical washdown due to cleaning or sanitization procedures in the food manufacturing process where a chlorine bleach solution is applied to the device. In some embodiments, the device may be made of steel. In other embodiments, the device may be made of stainless steel. In some embodiments, the device may also include non-metallic materials. For instance, in some embodiments, the device may include a padding material installed between the article and the strap.

Figure 2:
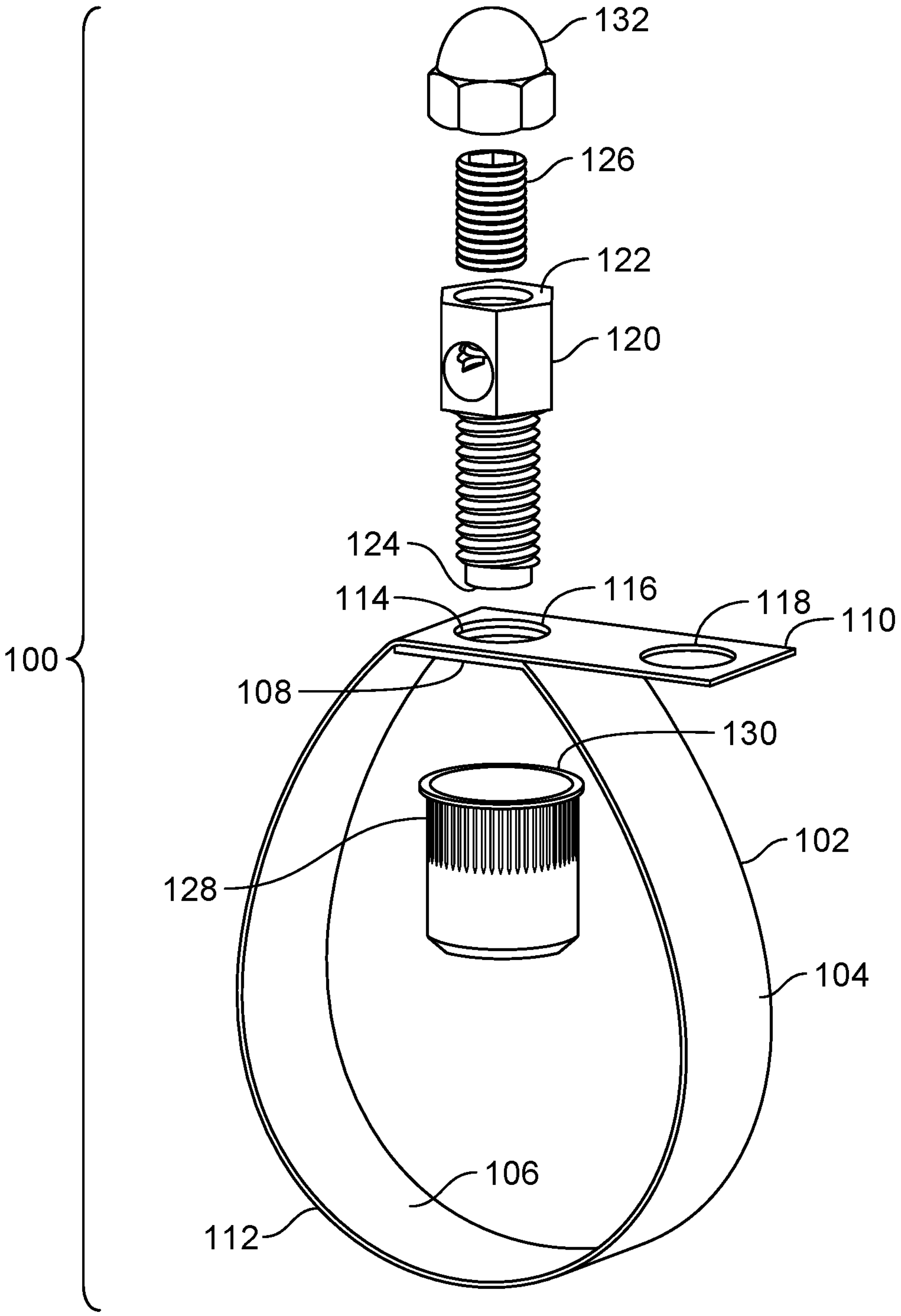
FIG. 2 depicts an exploded perspective view of the device, according to some embodiments.

FIG. 1 illustrates a perspective view of a device 100, according to some embodiments. FIG. 2 illustrates an exploded perspective view of the device 100, according to some embodiments. Unless specifically referenced, FIGS. 1 and 2 will be described collectively.

The device 100 includes a strap member 102. The strap member 102 is an elongate strap having a first side 104 and a second side 106. Additionally, the strap member 102 includes a first flange 108, a second flange 110, and a central portion 112 extending between, and connected to, each of the first flange 108 and the second flange 110. Therefore, the first flange 108 and the second flange 110 extend from opposing longitudinal ends of the central portion 112. In some embodiments, the central portion 112 may be an elongate strap portion that is integrally formed with the first flange 108 and the second flange. In other embodiments, the strap member 102 may be formed from one or more segments of strap that are joined together to form the strap member 102. For example, the strap member 102 may include two or more segments that are welded together into an integrally formed strap, but it is to be understood by one of ordinary skill in the art that the segments may be joined together and connected by any of a plurality of other means suitable for forming the strap member 102. In some embodiments, the strap member 102 may include a bend where the central portion borders the first flange 108 and the second flange 110. In some embodiments, the first flange 108 may be referred to as a first portion. In some embodiments, the second flange 110 may be referred to as a second portion. In some embodiments, the central portion 112 may be referred to as a third portion.

Referring to FIG. 2, the strap member 102 includes a first aperture 114 and a second aperture 116 extending therethrough. In some embodiments, the first aperture 114 is located on the first flange 108 and the second aperture 116 is located on the second flange 110. The strap member 102 is adapted to be installed onto the article by extending the central portion 112 around the article and the first flange 108 and the second flange 110 are drawn together from opposing sides of the article and positioned such that the first flange 108 and the second flange 110 are joined together and so that they contact along adjacent sides. In some embodiments, the strap member 102 is installed onto the article by aligning the first flange 108 and the second flange 110 where the first side 104 of the first flange 108 abuts the second side 106 of the second flange 110. In various embodiments, the first flange 108 and the second flange 110 may be drawn together to enable a tensioning member 120 to extend through the first flange 108 and the second flange 110 to install the strap member 102 around the article. For example, the first flange 108 and the second flange 110 may be aligned such that the first aperture 114 and the second aperture 116 are in colinear alignment to enable the tensioning member 120 to be extended therethrough as shown in FIG. 1. Accordingly, the flanges may be loosened or drawn together around the elongate article and receives the tensioning member 120.

In some embodiments, the strap member 102 may include a third aperture 118. The third aperture 118 is located on the second flange 110 adjacent the second aperture 116. Accordingly, in some embodiments, the first flange 108 and the second flange 110 may be aligned such that the first aperture 114 and the third aperture 118 are in colinear alignment to enable the tensioning member 120 to be extended therethrough.

In some embodiments, the strap member 102 may be a flexible elongate strap. In some embodiments, the central portion 112 may be flexibly installed onto the article and where the first flange 108 and the second flange 110 are substantially rigid. In some embodiments, the strap member 102 may be substantially rigid but where the central portion 112 includes adequate flexibility to enable the central portion 112 to be manipulated onto the article while retaining its shape and being resistant to deformation. In various embodiments, the strap member 102 is made of metal. The metal may be stamped and formed into the configuration of the strap member 102 as shown in FIG. 1, but it is to be understood by one of ordinary skill in the art that the embodiments shown in the figures are non-limiting examples and the strap member 102 may include other shapes, dimensions, and features in accordance with this disclosure. For example, a length and width of the strap member 102 may vary based on the dimensions of the article. In other embodiments, the dimensions of the strap member 102 may also be based on the other components of the device 100, such as the size and dimensions of the tensioning member 120. In other embodiments, the length of the central portion may vary. In some embodiments, the strap member 102 may include a certain length and the strap member 102 may be adapted to be installed onto a plurality of articles having various sizes or diameters.

The device 100 includes a tensioning member 120. The tensioning member 120 is defined by a body having a first end 122 and a second end 124. Referring to FIG. 2, the tensioning member 120 includes a head portion 136 and a cylindrical portion 138. The head portion 136 is located at the first end 122. The cylindrical portion 138 extends from the head portion 136 towards the second end 124. In some embodiments, the head portion 136 and the cylindrical portion 138 may be integrally formed to form the body of the tensioning member 120.

The cylindrical portion 138 includes one or more threads formed on the length of the cylindrical portion 138 between the first end 122 and the second end 124. In some embodiments, a portion of the length of the cylindrical portion 138 may include the one or more threads. For example, in some embodiments, the cylindrical portion 138 may include a shank adjacent the head portion 136 and the first end 122, the shank being substantially smooth and not including the one or more threads formed thereon. In some embodiments, the second end 124 of the tensioning member 120 may include a tapered end. In some embodiments, the second end 124 of the tensioning member 120 may be substantially flat. In other embodiments, the second end 124 may be convex (e.g., rounded). In some embodiments, the tensioning member 120 may include a shank adjacent the first end 122, the shank being substantially smooth and not including the one or more threads.

The device 100 includes a set screw member 126. The set screw member 126 is defined by a body having a cylindrical shape and includes one or more threads formed on an outer longitudinal surface of the set screw member 126. The one or more threads extend circumferentially along the length of the set screw member 126. Additionally, the one or more threads of the set screw member 126 correspond to the threads of the bore 140.

The set screw member 126 is adapted to be installed into the tensioning member 120 and impinge upon an electrical conductor that is also inserted into the tensioning member 120 to electrically and mechanically connect the electrical conductor to the tensioning member 120 and the device to provide grounding capabilities to the elongate article.

Accordingly, the set screw member 126 is threaded into the head portion 136 (FIG. 3) and impinges upon an electrical conductor also inserted into the head portion 136 (FIG. 3) to impinge on the electrical conductor to electrically and mechanically connect the electrical conductor to the tensioning member 120 as will be further described herein.

The device 100 includes a first nut 128. The first nut 128 is defined by a body and includes a bore 130 extending therethrough. The bore 130 includes one or more threads formed on an inner surface of the bore 130. Additionally, the one or more threads of the bore 130 correspond to the one or more threads on the tensioning member 120 as will be further described herein. Accordingly, the tensioning member 120 is adapted to extend through the strap member 102 and also extends through the first nut 128. In some embodiments, the bore 130 may be referred to as a third bore.

In some embodiments, the first nut 128 may be fixedly attached to the strap member 102. In some embodiments, the first nut 128 may be attached to the strap member 102 at the first flange 108. Accordingly, the first nut 128 may be positioned so that a portion of the first nut 128 extends through the first aperture 114. Specifically, an end of the first nut 128 that is adapted to receive the tensioning member 120 is inserted into the first aperture 114. In this regard, the first nut 128 is positioned such that the body of the first nut 128 is adjacent the second side 106 of the strap member 102 and a portion of the first nut 128 extends through the strap member 102 from the second side 106 and towards the first side 104. Furthermore, a clamping force may then be applied to the first nut 128 to attach the first nut 128 to the strap member 102 at the first aperture 114. The clamping force mechanically deforms the first nut 128 in the first aperture 114, thereby mechanically binding the first nut 128 to the strap member 102 through mechanical deformation, thereby restricting movement of the first nut 128 relative to the strap member 102 in an axial and radial direction. In some embodiments, the first nut 128 may be attached to the strap member 102 by a user. In some embodiments, the clamping force may be applied via a clamping tool. In some embodiments, the clamping tool may be a hand clamping tool.

In some embodiments, the first nut 128 may be a lock nut. In some embodiments, the first nut 128 may be a press-fit nut. In other embodiments, the first nut 128 may be a rivet nut. However, it is to be understood that the first nut 128 may be any of a plurality of nuts capable of attaching to the strap member 102 by mechanically binding to the strap member 102 in response to a clamping force.

The device 100 includes a second nut 132. The second nut 132 includes a bore 134 that extends into the second nut 132. The bore 134 extends through a portion of the second nut 132. In some embodiments, the bore 134 extends through the second nut 132 from one side of the second nut 132 and out through to the opposite side. In some embodiments, the bore 134 includes one or more threads formed on the inner surface of the bore 134. Additionally, the one or more threads of the bore 134 correspond to the threads on the set screw member 126. In some embodiments, the bore 134 may be referred to as a fourth bore.

Figure 3:
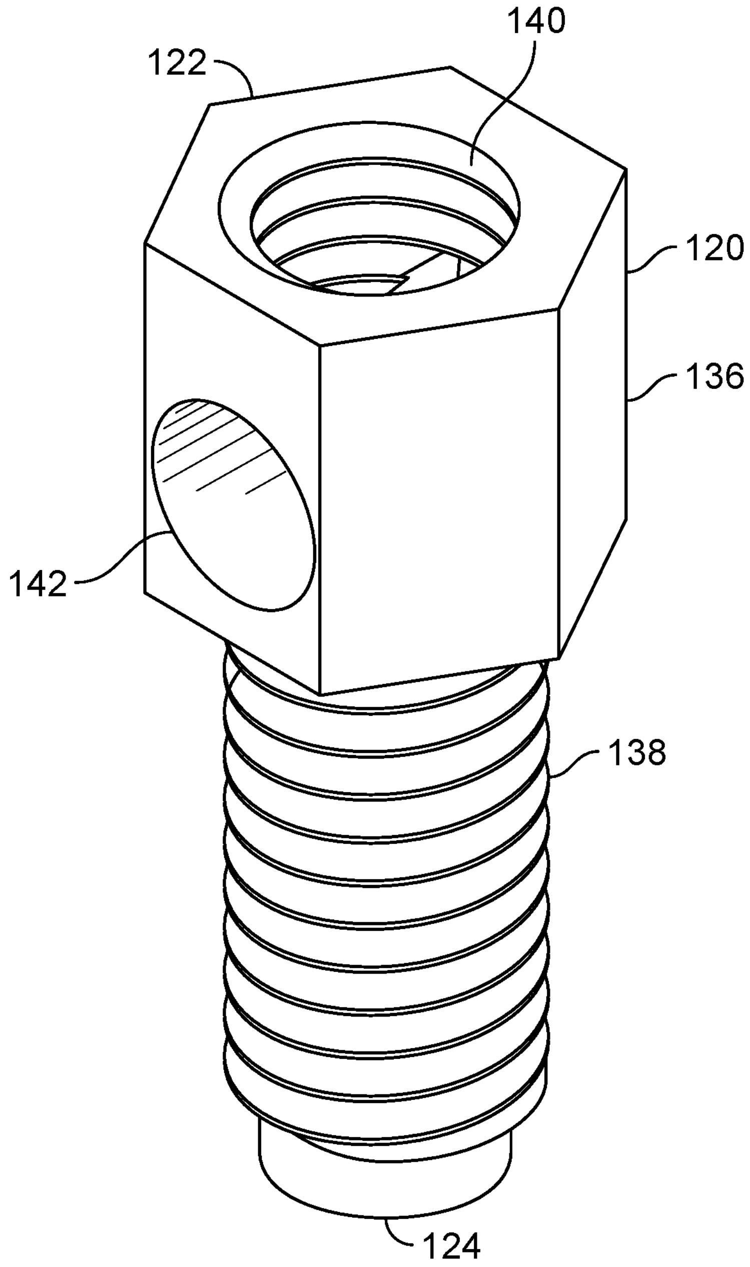
FIG. 3 depicts a perspective view of a tensioning member, according to some embodiments.
Figure 4:
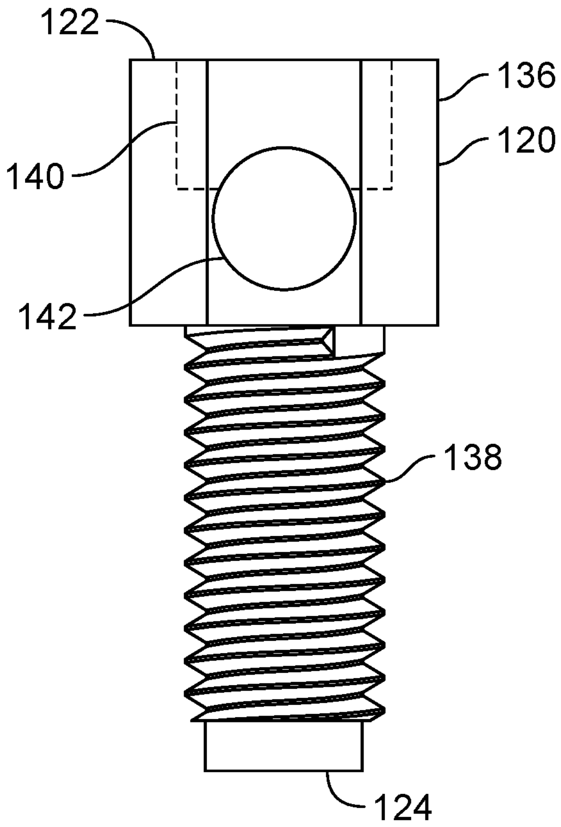
FIG. 4 depicts a side view of the tensioning member, according to some embodiments.

The second nut 132 is adapted to be installed onto the set screw member 126 by engaging the one or more threads of the set screw member 126. Accordingly, as shown in FIG. 3, the second nut 132 is installed onto the set screw member 126 at an end opposite the tensioning member 120 when the set screw member 126 is installed onto the tensioning member 120. Additionally, the second nut 132 can be threaded onto the exposed portion of the set screw member 126 that extends from the first end 122 of the tensioning member 120 until the second nut 132 engages the first end 122 of the tensioning member 120. The second nut 132 acting on the tensioning member 120 covers the exposed portion of the set screw member 126 that extends from the tensioning member 120. Additionally, tightening the second nut 132 to enable the second nut 132 to act on the tensioning member 120 also retains the position of the set screw member 126 relative to the tensioning member thereby restricting the movement of the set screw member 126 in the bore 140 (FIG. 4).

Referring to FIG. 1, the second nut 132 is a cap nut. In some embodiments, the second nut 132 may be an acorn cap nut. In other embodiments, the second nut 132 may be a lock nut. The second nut 132 includes a unique circumferential profile to facilitate threading the second nut 132 onto the set screw member 126. In some embodiments, the profile can correspond to a hand tool, such as a wrench, for driving the second nut 132 onto the threads of the set screw member 126. In some embodiments, the second nut 132 may include a hexagonal profile.

Figure 5:
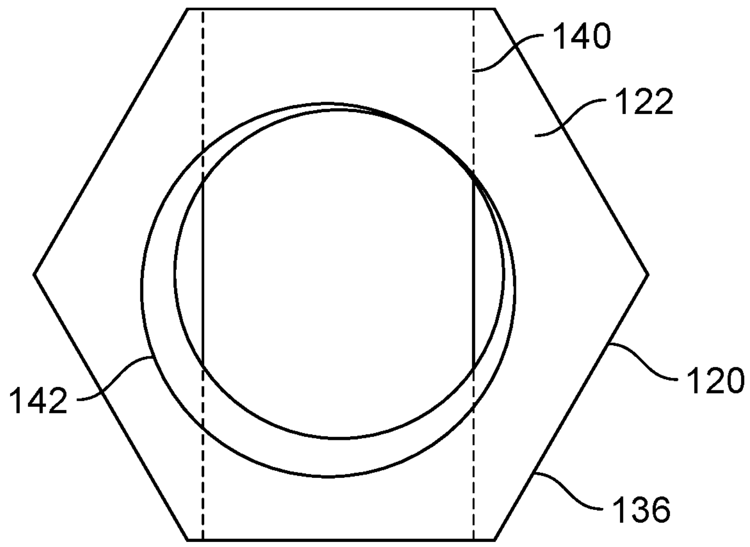
FIG. 5 depicts a top view of the tensioning member, according to some embodiments.

FIG. 3 shows a perspective view of the tensioning member 120 from FIG. 1, according to some embodiments. FIG. 4 shows a side view of the tensioning member 120, according to some embodiments. FIG. 5 shows a top view of the tensioning member 120, according to some embodiments. Unless specifically referenced, FIGS. 3-5 will be described collectively.

Referring to FIG. 3, the tensioning member 120 includes the head portion 136 and the cylindrical portion 138. The head portion 136 includes a bore 140 and a bore 142. The bore 140 extends from the first end 122 of the tensioning member 120 and towards the cylindrical portion 138 in a first direction. The bore 140 also includes one or more threads formed on an inner surface. The bore 142 extends through the head portion 136 in a second direction. In some embodiments, the bore 140 may be substantially perpendicular to the bore 142. Therefore, in some embodiments, the first direction may also substantially perpendicular to the second direction. In some embodiments, the bore 142 may include a substantially smooth inner surface. Referring to FIG. 4, the bore 140 extends partway through the head portion 136. Additionally, the bore 140 extends from the first end 122 and to the bore 142 to place the bore 140 in communication with the bore 142.

The cylindrical portion 138 includes a cylindrical shape and extends from the head portion 136 towards the second end 124. The cylindrical portion 138 includes one or more threads formed on an outer longitudinal surface of the cylindrical portion 138. The one or more threads extend circumferentially along the length of the cylindrical portion 138. In some embodiments, a portion of the cylindrical portion 138 may include the one or more threads. For example, a segment of the cylindrical portion 138 adjacent the second end 124 may not include threads. In another example, the segment of the cylindrical portion 138 that is adapted to extend from the first nut 128 may not include threads.

The tensioning member 120 provides a conductive discharge path for electrical current between the article and the grounded electrical conductor. Accordingly, the tensioning member 120 (e.g., jack bolt) is capable of carrying at least 2,450 amps. In some embodiments, the device 100 may be capable of conducting at least 2,450 amps of current. In some embodiments, the device 100 may be capable of conducting more than 2,450 amps of current. In some embodiments, the device 100 may be capable of conducting at least 2,400 amps of current. In some embodiments, the device 100 may be capable of conducting at least 2,300 amps of current. In some embodiments, the device 100 may be capable of conducting at least 2,200 amps of current. In some embodiments, the device 100 may be capable of conducting at least 2,000 amps of current. In some embodiments, the device 100 may be capable of conducting at least 2,500 amps of current. In some embodiments, the device 100 may be capable of conducting at least 2,600 amps of current. In some embodiments, the device 100 may be capable of conducting at least 2,700 amps of current. In some embodiments, the device 100 may be capable of conducting at least 2,800 amps of current. In some embodiments, the device 100 may be capable of conducting at least 2,900 amps of current. In some embodiments, the device 100 may be capable of conducting at least 3,000 amps of current.

The device 100 is capable of carrying the specified electrical current for a period of time and being resistant to cracking, breaking, or melting when subjected to the specified current for the specified period of time. In some embodiments, the period of time may be a predetermined period of time. In other embodiments, the period of time may be a specified period of time. In some embodiments, the device 100 may also be capable of maintaining the elongate article in connection to the grounded conductor after carrying the specified current for the specified period of time.

Figure 6:
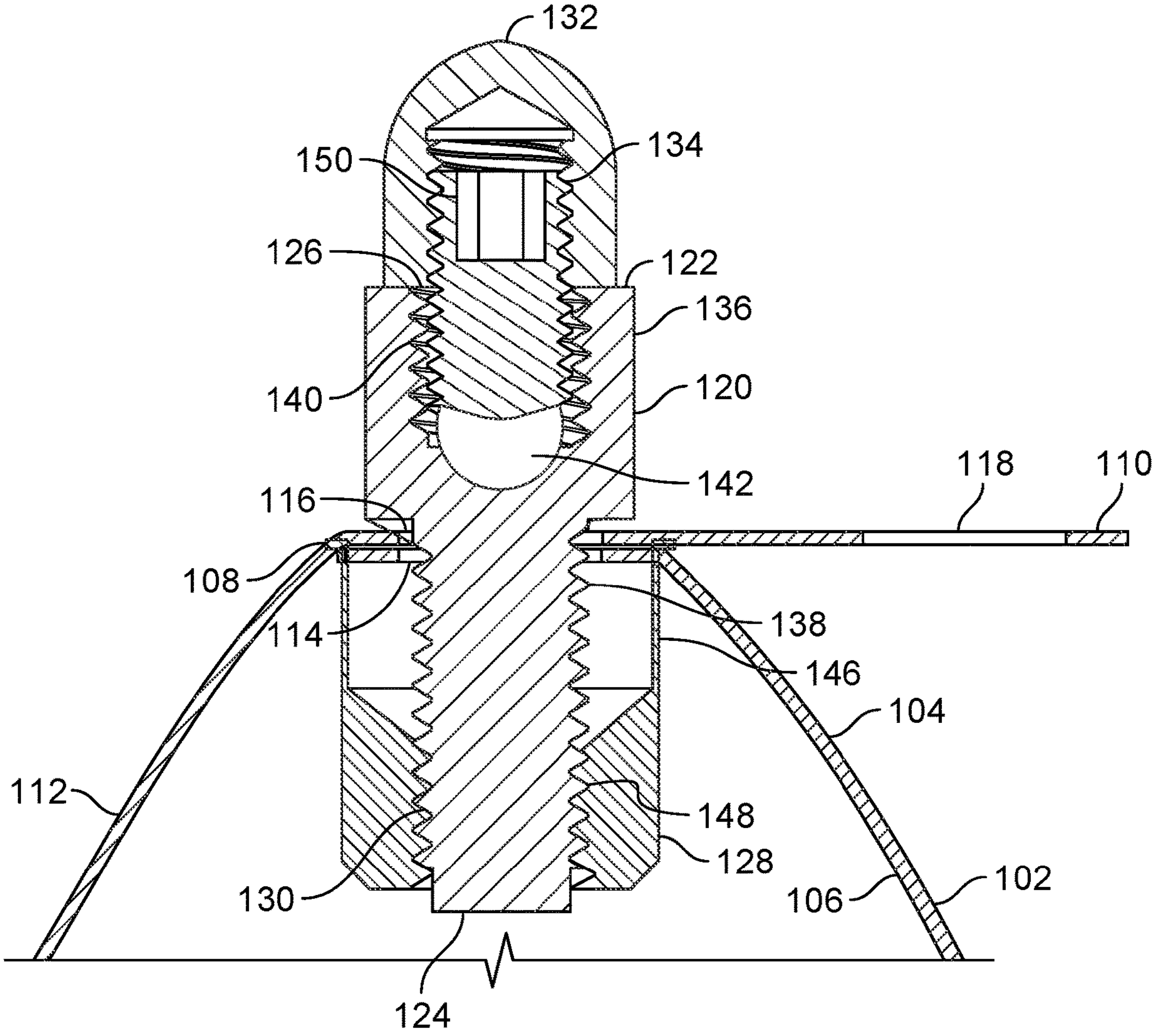
FIG. 6 depicts a side sectional view of the device, according to some embodiments.

FIG. 6 is a sectional side view of the device 100, according to some embodiments.

The tensioning member 120 is adapted to receive the set screw member 126 at the bore 140. The set screw member 126 engages the tensioning member 120 by threading into the bore 140 and extending into the channel of bore 142. Bore 142 is also adapted to receive an electrical conductor in bore 142. In some embodiments, the electrical conductor can be inserted into bore 142 such that the electrical conductor extends past the opening to bore 140 in bore 142. Accordingly, in some embodiments, the set screw member 126 may be threaded into the bore 140 to drive the set screw member 126 into the bore 142 and to enable the set screw member 126 to impinge on the electrical conductor positioned in bore 142. Accordingly, the set screw member 126 electrically and mechanically connects the tensioning member 120 to the electrical conductor as a result of the set screw member 126 being threaded into the head portion 136 at the bore 140 and impinging on the electrical conductor located in the bore 142. Additionally, in some embodiments, when the tensioning member 120 is positioned such that the second end 124 of the tensioning member 120 contacts a surface of the electrically conductive elongate article, the elongate article may also be electrically connected to the grounded electrical conductor through the tensioning member 120.

In some embodiments, the electrical conductor may further include an electrical connector installed onto the conductor, and the connecter may be inserted into the second bore. Furthermore, the set screw member 126 may be threaded into the bore 140 and impinge on the electrical connector inserted into the bore 142 to electrically and mechanically connect the conductor to the tensioning member 120 and the article.

The set screw member 126 includes a socket 150 located at an end of the set screw member 126 adapted to receive the second nut 132. The socket 150 includes a unique profile adapted to receive a driver bit to drive the set screw member 126 into the tensioning member 120. More particularly, to drive the set screw member 126 into the bore 140. In some embodiments, the socket 150 may include a hexagonal shape adapted to receive a hexagonally shaped tool (e.g., allen key) to drive the set screw member 126. In other embodiments, the socket 150 may include any of a plurality of other profiles capable of receiving a tool bit capable of driving the set screw member 126 in and out of the tensioning member 120.

As shown in FIG. 6, the bore 130 may include a first segment 146 having a first diameter and a second segment 148 having a second diameter, the first diameter being wider than the second diameter. Additionally, in some embodiments, the second segment 148 may include the one or more threads formed on the inner surface of the second section. In some embodiments, the first nut 128 may include one or more threads formed on the inner surface of the bore 130 that corresponds to the one or more threads of the tensioning member 120. In some embodiments, the bore 130 of the first nut 128 may include a consistent diameter as the bore 130 extends through the first nut 128.

The tensioning member 120 extends through the first nut 128 by engaging the threads of the first nut 128. Additionally, the position of the tensioning member 120 relative to the first nut 128 may be adjustable in the direction a by rotating the tensioning member 120 clockwise or counterclockwise relative to the first nut 128. Therefore, by adjusting the position of the tensioning member 120, the tensioning member 120 can extend from the first nut 128 to contact the elongate article and to apply the tension force between the strap member 102 and the elongate article. In some embodiments, the bore of the first nut 128 may be referred to as a third bore.

The tensioning member 120 is adapted to extend through the first aperture 114 and the second aperture 116 of the strap member 102 and through a first nut 128. Accordingly, the threads of the cylindrical portion 138 engage the threads at the bore 130 of the first nut 128 to enable the tensioning member 120 to extend through the first nut 128. Additionally, the head portion 136 acts upon the first flange 108 and the second flange 110 as the tensioning member 120 is threaded through the first nut 128 so that a compressive force is applied between the head portion 136 and the first nut 128 to retain a position of the strap member 102 between the tensioning member 120 and the first nut 128. The tensioning member 120 is also adapted to extend through the first nut 128 to contact a metal surface of the article to place the article in connection with a conductor connected to the tensioning member 120. Accordingly, the tensioning member 120 is also adapted to electrically connect the article to the electrical conductor to provide a discharge path for electrical current from the article to the grounded electrical conductor through the tensioning member 120.

The position of the tensioning member 120 relative to the first nut 128 may be adjustable in the direction a substantially perpendicular to a central longitudinal axis of the article. Additionally, the position of the tensioning member 120 relative to the first nut 128 and the article may be adjusted in the direction a by rotating the tensioning member 120 in the clockwise or counterclockwise direction in the threads of the first nut 128. The position of the tensioning member 120 relative to the first nut 128 may be adjusted to enable the tensioning member 120 to adjustably extend towards the article until the second end 124 of the tensioning member 120 contacts a surface of the article. Additionally, the position of the tensioning member 120 in the direction a may also be adjusted to apply a tension force onto the article and the strap member 102. Applying the tension force on the strap member 102 and the article extending therethrough facilitates connected engagement between the tensioning member 120 and the surface of the article and also facilitates retention of the device on the article.

In various embodiments, the position of the device 100 relative to the central longitudinal axis of the article may be retained by the tensioning applied by the tensioning member 120 onto the article and the strap member 102, where movement of the device 100 is thereby restricted along the longitudinal axis of the article. In various embodiments, the tensioning member 120 may be referred to as a screw, bolt, coupler, jack bolt, or other like members.

Figure 7:
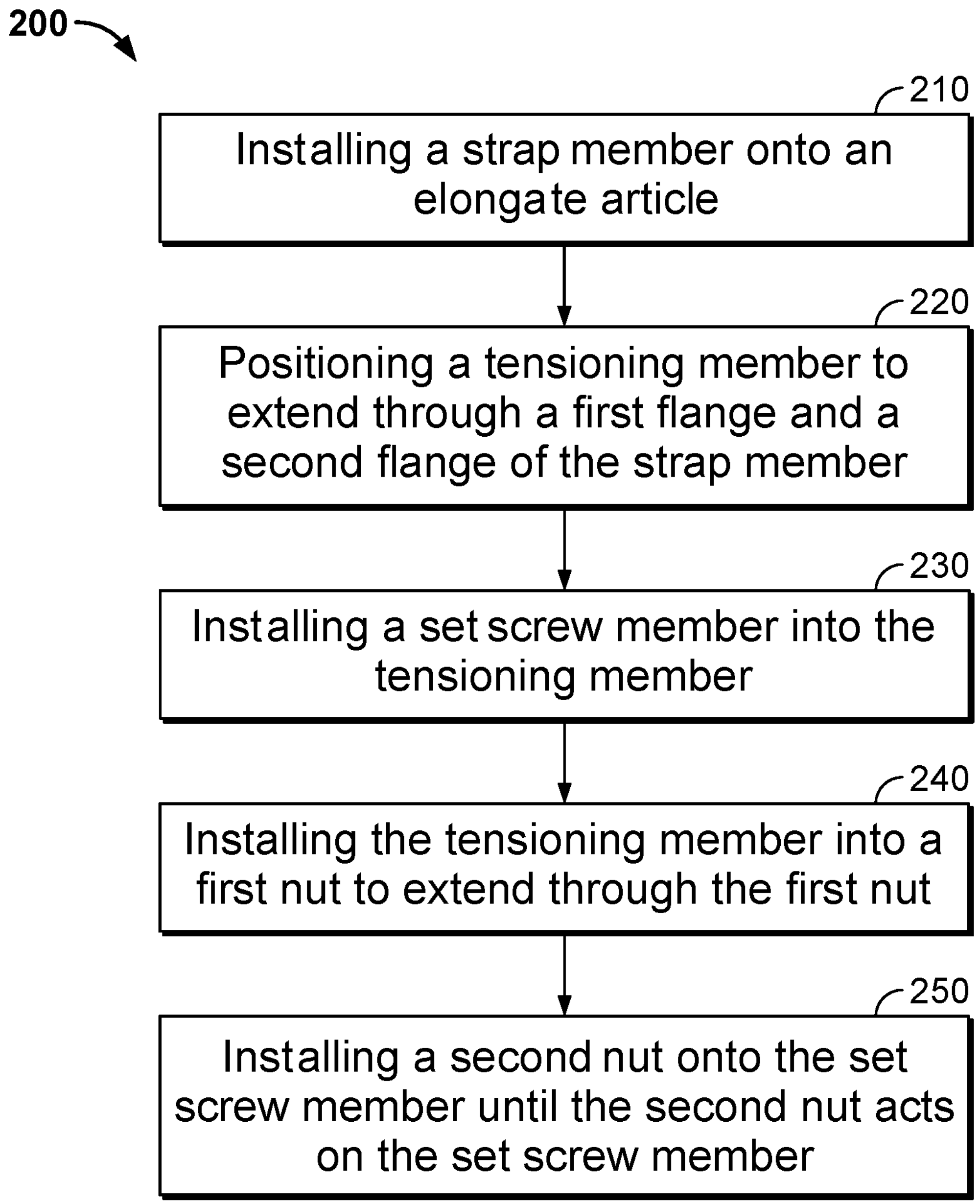
FIG. 7 depicts a method of installing the device, according to some embodiments.

FIG. 7 shows a method 200 of installing the device 100 of FIG. 1, according to some embodiments. At 210, the method 200 includes installing a strap member 102 onto an elongate article. In some embodiments, the article is an electrically conductive article, such as a elongate article. In some embodiments, the strap member 102 is installed around a circumference of the article where a first flange 108 is positioned to slidably contact a second flange 110 along adjacent sides. The first flange 108 and the second flange 110 of the strap member 102 is extended around the outer circumference of the article (e.g., metal pipe) until the first flange 108 meets the second flange 110 from opposing sides of the article.

In some embodiments, installing the strap member 102 to be positioned around a circumference of the article includes manipulating the central portion 112 around the article and drawing the first flange 108 and the second flange 110 together from opposing sides of the article. Additionally, in some embodiments, the first flange 108 and the second flange 110 are drawn together so that a first side 104 of the first flange 108 slidably contacts a second side 106 of the second flange 110, the first flange 108 and the second flange 110 being positioned so that the first aperture 114 and the second aperture 116 are in colinear alignment. Additionally, aligning the first flange 108 and the second flange 110 to enable the first aperture 114 to be in colinear alignment with the second aperture 116 to enable the tensioning member 120 to be inserted through the first aperture 114 and the second aperture 116.

In some embodiments, positioning the strap member 102 around the article includes drawing the first flange 108 and the second flange 110 together so the first flange 108 slidably contacts the second flange 110 and the first aperture 114 is in colinear alignment with the third aperture 118 to enable tensioning member 120 to be inserted through the first aperture 114 and the second aperture 116 of the strap member 102. In some embodiments, positioning the strap member 102 further includes positioning a first flange 108 relative to a second flange 110 so the first side 104 of the first flange 108 abuts the second side 106 of the second flange 110 around the elongate article.

At 220, the method 200 includes positioning a tensioning member 120 to extend through the first flange 108 and the second flange 110. In some embodiments, positioning the tensioning member 120 further includes extending the tensioning member 120 through the first nut 128. In some embodiments, positioning the tensioning member 120 through the first nut 128 further includes threadingly engaging the threads of the bore 130 of the first nut 128 and adjusting the position of the tensioning member 120 relative to the first nut 128 to enable the second end of the tensioning member 120 to extend from the first nut 128.

In some embodiments, the method 200 further includes attaching the first nut 128 to the strap member 102. In some embodiments, attaching the first nut 128 to the strap member 102 includes inserting the first nut 128 through the first aperture 114 to enable a portion of the first nut 128 to extend through the strap member 102 from the second side 106 towards the first side 104. In some embodiments, the method 200 includes applying a clamping force to the first nut 128 to attach the first nut 128 to the strap member 102. In some embodiments, attaching the first nut 128 to the strap member 102 by applying a clamping force onto the first nut 128 mechanically deforms the first nut 128 around a profile of the strap member 102 and the first aperture 114. In some embodiments, the first nut 128 is attached to the strap member 102 in the first aperture 114 using a clamping tool. In some embodiments, the clamping tool may be a hand tool.

At 230, the method 200 includes installing a set screw member 126 into the tensioning member 120. The set screw member 126 includes one or more threads formed on the outer longitudinal surface. Additionally, the tensioning member 120 includes a head portion 136. The head portion 136 includes a bore 140 and a bore 142. The bore 140 includes one or more threads formed on the inner surface of the bore 140 that correspond to the threads on the set screw member 126. Accordingly, in some embodiments, installing the set screw member 126 into the tensioning member 120 includes the threads of the set screw member 126 threadingly engaging the threads of the bore 140 and driving the set screw member 126 into the tensioning member 120. Furthermore, a position of the set screw member 126 relative to the tensioning member 120 may be adjustable to enable the set screw member 126 to extend into the bore 142 and impinge on an electrical conductor positioned in the bore 142. In some embodiments, impinging on the electrical conductor mechanically and electrically connects the tensioning member 120 to the electrical conductor.

At 240, the method 200 includes installing the tensioning member 120 into a first nut 128 to extend through the first nut 128. In some embodiments, the tensioning member 120 includes one or more threads formed on an outer surface of the tensioning member 120. In some embodiments, the tensioning member 120 includes a cylindrical portion that includes the one or more threads. Additionally, the first nut 128 includes a bore 130 that includes one or more threads formed on the inner surface that corresponds to the threads on the tensioning member 120. Accordingly, installing the tensioning member 120 into the first nut 128 includes the threads of the tensioning member 120 threadingly engaging the threads of the bore 130 to enable the tensioning member 120 to extend through the first nut 128 and towards the article extending through the strap member 102. Additionally, the position of the tensioning member 120 relative to the first nut 128 may be adjustable relative to the first nut 128 in a direction a to enable the tensioning member 120 to contact a surface of the article and to enable the tensioning member 120 to apply a tension force between the strap member 102 and the article. In some embodiments, adjusting the position of the tensioning member 120 relative to the first nut 128 includes rotating the tensioning member 120 in the clockwise and counterclockwise direction to move the tensioning member 120 in the direction a substantially perpendicular to a longitudinal axis of the article.

At 250, the method 200 includes threading a second nut 132 onto the set screw member 126 until the second nut 132 acts on the tensioning member 120 to retain a position of the set screw member 126. The second nut 132 retains a position of the set screw member 126 relative to the tensioning member 120. In some embodiments, threading the second nut 132 onto the set screw member 126 includes rotating the second nut 132 in the clockwise and counterclockwise direction to adjust the position of the second nut 132 relative to the tensioning member 120. In some embodiments, threading the second nut 132 to act on the tensioning member 120 applies a compressive force between the tensioning member 120 and the second nut 132 and retains a position of the set screw member 126 relative to the tensioning member 120. Accordingly, the set screw member 126 may be threaded into the bore 140 and impinge upon the electrical conductor that extends through the bore 142 and the second nut 132 may facilitate retaining a position of the set screw member 126 in the tensioning member 120.

In some embodiments, the method 200 further includes installing a first nut 128 into a first aperture 114 at the first flange 108. In some embodiments, installing the first nut 128 further includes positioning the first nut 128 to extend through the first aperture 114 from the first side 104 of the strap member 102 towards the second side 106. In some embodiments, the method 200 further includes applying a clamping force onto the first nut 128 to mechanically bind the first nut 128 to the strap member 102 in the first aperture 114.

In some embodiments, positioning the tensioning member 120 through the first flange 108 and the second flange 110 of the strap member 102 further includes positioning the tensioning member 120 to extend through the first aperture 114 on the first flange 108 and the second aperture 116 on the second flange 110. In other embodiments, positioning the tensioning member 120 through the first flange 108 and the second flange 110 of the strap member 102 further includes positioning the tensioning member 120 to extend through the first aperture 114 on the first flange 108 and the third aperture 118 on the second flange 110.

In some embodiments, the method may include installing a connector 152 onto the set screw member 126 between the tensioning member 120 and the second nut 132. The connector 152 may include an aperture that extends therethrough and the connector 152 may be positioned so the set screw member 126 extends through the connector 152 and connected to the tensioning member 120 in response to the second nut 132 acting on the connector 152 and the tensioning member 120 when tightened onto the set screw member 126.

Figure 8:
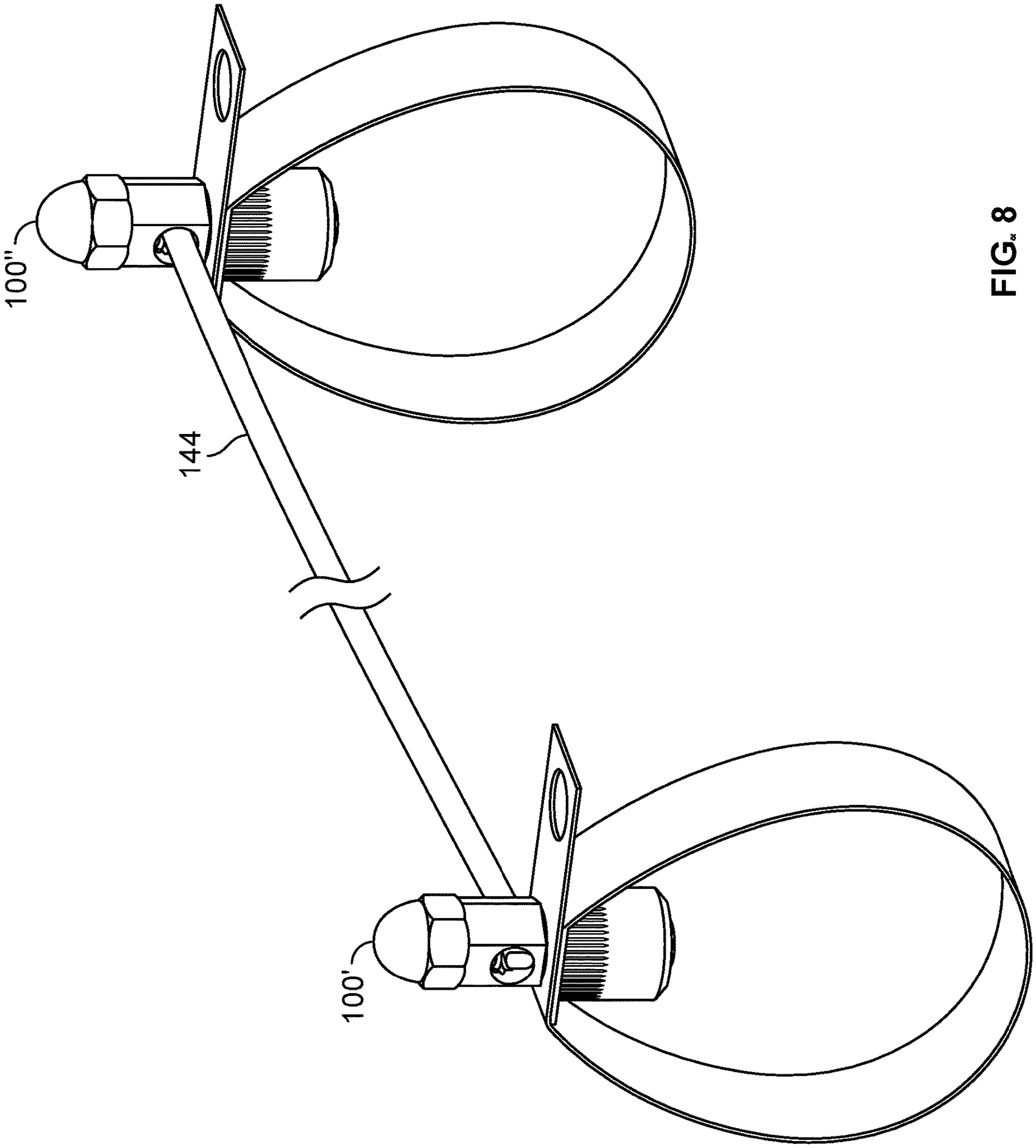
FIG. 8 depicts a perspective view of the device, according to some embodiments.

FIG. 8 shows a perspective view of the device 100 of FIG. 1, according to some embodiments. The device 100 is connected to the connector 152. The connector 152 is installed onto the tensioning member 120 between the first nut 128 and the second nut 132 and also connected to an electrical conductor 144 to provide a discharge path for the electrical potential built up in the elongate article. In the embodiment shown in FIG. 6, the device 100 is electrically connected with device 100" through the electrical conductor 144. In some embodiments, the device 100 and/or the device 100" may be electrically connected with the ground. In other embodiments, the device 100 may also be in electrical connection with one or more of the device 100 in series using one or more of the electrical conductor 144 and in electrical connection with the ground.

In some embodiments, the device 100 may be in electrical connection with any of a plurality of electrical conductors suitable for conducting a specific amount of electrical current to the ground. For example, the electrical conductor may be a bonded electrical jumper capable of carrying at least 2,450 amps of current.

In some embodiments, the device 100 may be installed onto a section of elongate article. In some embodiments, the elongate article may be made of one or more sections of elongate article and each section may include the device 100 installed onto the elongate article. In some embodiments, a section of elongate article may include one or more of the device 100 installed thereon. For example, a particular section may include a first device and a second device installed at opposite ends of the elongate article section.

In some embodiments, the device 100 may include one or more of the connector 152 coupled to the tensioning member 120. In some embodiments, the device 100 may include a first connector and a second connector installed onto the tensioning member 120. For example, the elongate article can include a first device, a second device, and a third device installed onto the elongate article in series and where the third device is also electrically connected to the ground. It is to be understood by one of ordinary skill in the art that the elongate article may include one or more segments and may include one or more of the device 100 installed thereon. Furthermore, it is to be understood by one of ordinary skill in the art that the device 100 may include one or more of the connector 152 installed thereon to enable the device 100 to be connected to another one of the device 100 in series and/or the ground to provide a discharge path for electrical current to the elongate article or to enable the device 100 to act as a relay in electrically connecting another device 100 to the ground in accordance with the present disclosure.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

ASPECTS

Various Aspects are described below. It is to be understood that any one or more of the features recited in the following Aspect(s) can be combined with any one or more other Aspect(s).

Aspect 1. A device comprising: a tensioning member comprising: a first end, a second end, a head portion comprising: a first bore, a second bore, wherein the first bore is in communication with the second bore, and a cylindrical portion, wherein the cylindrical portion extends from the head portion towards the second end and includes one or more threads formed along a length of the cylindrical portion; a set screw member located in the first bore, wherein the set screw member is configured to engage an electrical conductor located in the second bore to connect the tensioning member to the electrical conductor; and a first nut located adjacent the second end of the tensioning member; wherein the tensioning member extends through the first nut and the second end of the tensioning member is configured to contact a surface of an elongate article to electrically connect the elongate article to the tensioning member and the electrical conductor.

Aspect 2. The device according to aspect 1, further comprising: a strap member comprising: a first flange, a second flange, a central elongate portion, and wherein the first flange and the second flange extend from opposing ends of the central elongate portion, wherein the central elongate portion is configured to substantially extend around a circumference of an elongate article until the first flange is in contact with the second flange along adjacent sides.

Aspect 3. The device according to aspect 2, wherein a position of the tensioning member in the first nut is adjustable in a direction substantially perpendicular to a longitudinal axis of the elongate article to apply a tension force between the strap member and the elongate article.

Aspect 4. The device according to aspects 2 or 3, wherein the strap member further includes: a first aperture at the first flange, and a second aperture at the second flange, wherein the tensioning member extends through the first aperture and the second aperture to retain the strap member around the elongate article.

Aspect 5. The device according to aspects 2, 3, or 4, wherein the strap member further includes: a third aperture at the second flange adjacent the second aperture, wherein the tensioning member is configured to extend through the first aperture and the third aperture to retain the strap member around the elongate article.

Aspect 6. The device according to aspects 2, 3, 4, or 5, wherein the first nut is configured to extend into the first aperture and connect to the first flange by binding to the strap member through mechanical deformation in response to a clamping force applied to the first nut.

Aspect 7. The device according to any of the preceding aspects, wherein the set screw member impinges on the electrical conductor to fixedly retain the electrical conductor in the second bore and to connect the tensioning member to the electrical conductor.

Aspect 8. The device according to any of the preceding aspects, wherein the first bore extends from the first end of the tensioning member towards the second end; wherein the second bore extends through the head portion in a direction substantially perpendicular to the first bore.

Aspect 9. The device according to any of the preceding aspects, further comprising: a second nut, wherein the second nut is configured to thread onto the set screw member opposite the tensioning member and act upon the head portion of the tensioning member to retain a position of the set screw member in the first bore.

Aspect 10. An apparatus comprising: a strap member comprising: a first flange, a second flange, and a central elongate portion; a tensioning member comprising: a head portion at a first end, a first bore located in the head portion, a second bore located in the head portion in communication with the first bore, wherein the second bore being in communication with the first bore, and a cylindrical portion at a second end; a set screw member located in the first bore; a first nut; and a second nut; wherein the tensioning member extends through the first nut and the second end of the tensioning member is configured to contact a surface of an elongate article to electrically connect the elongate article to the tensioning member, and a position of the tensioning member in the first nut is adjustable in a direction substantially perpendicular to a longitudinal axis of the elongate article to apply a tension force between the strap member and the elongate article.

Aspect 11. The apparatus according to aspect 10, wherein the second bore extends through the head portion in a direction substantially perpendicular to the first bore, wherein the second bore is configured to receive an electrical conductor positioned in the second bore.

Aspect 12. The apparatus according to aspect 10 or 11, wherein the set screw member extends from the first bore into the second bore and impinges on the electrical conductor to fixedly retain the electrical conductor in the second bore and connect the tensioning member to the electrical conductor; wherein the tensioning member is further configured to electrically connect the elongate article to the electrical conductor.

Aspect 13. The apparatus according to aspects 10, 11, or 12, wherein the strap member further comprises: a first aperture at the first flange, a second aperture at the second flange, and wherein the central elongate portion is configured to substantially extend around a circumference of the elongate article until the first flange is in contact with the second flange along adjacent sides, wherein the tensioning member is configured to extend through the first aperture and the second aperture to retain the strap member around the elongate article.

Aspect 14. The apparatus according to aspect 13, wherein the first nut is configured to extend into the first aperture and connect to the first flange by binding to the strap member through mechanical deformation in response to a clamping force applied to the first nut.

Aspect 15. The apparatus according to aspects 13 or 14, wherein the strap member further includes: a third aperture at the second flange adjacent the second aperture, wherein the tensioning member is configured to extend through the first aperture and the third aperture.

Aspect 16. The apparatus according to aspects 10, 11, 12, 13, 14, or 15, wherein the tensioning member is further configured to apply a tension force between the strap member and the elongate article.

Aspect 17. A jack bolt comprising: a body having a first end and a second end, the body comprising: a head portion located at the first end, the head portion comprising: a first bore, a second bore, wherein the second bore extends through the head portion in a direction substantially perpendicular to the first bore and the second bore is in communication with the first bore, and a cylindrical portion located at the second end, wherein the cylindrical portion extends from the head portion to the second end and includes threads formed on a length of the cylindrical portion.

Aspect 18. The jack bolt according to aspect 17, wherein the first bore extends from the first end towards the second end in the head portion, wherein the first bore includes threads formed on an inner surface of the first bore and the first bore is configured to receive a set screw member.

Aspect 19. The jack bolt according to aspects 17 or 18, wherein the second bore is configured to receive an electrical conductor positioned in the second bore; wherein the set screw member is configured to extend from the first bore into the second bore and impinge on the electrical conductor to fixedly retain the electrical conductor in the second bore and to connect the jack bolt to the electrical conductor.

Aspect 20. The jack bolt according to aspects 17, 18, or 19, wherein the jack bolt comprises electrically conductive metallic material; wherein the jack bolt comprises dimensions capable of carrying at least 2,450 amps for a predetermined period of time.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A device comprising:
a tensioning member comprising:
a first end,
a second end,
a head portion comprising:
a first bore,
a second bore,
wherein the first bore is in communication with the second bore,
and
a cylindrical portion,
wherein the cylindrical portion extends from the head portion towards the second end and includes one or more threads formed along a length of the cylindrical portion;
a set screw member located in the first bore,
wherein the set screw member is configured to engage an electrical conductor located in the second bore to connect the tensioning member to the electrical conductor; and
a first nut located adjacent the second end of the tensioning member;
wherein the tensioning member extends through the first nut and the second end of the tensioning member is configured to contact a surface of an elongate article to electrically connect the elongate article to the tensioning member and the electrical conductor.

2. The device according to claim 1, further comprising:
a strap member comprising:
a first flange,
a second flange,
a central elongate portion, and
wherein the first flange and the second flange extend from opposing ends of the central elongate portion,
wherein the central elongate portion is configured to substantially extend around a circumference of an elongate article until the first flange is in contact with the second flange along adjacent sides.

3. The device according to claim 2, wherein a position of the tensioning member in the first nut is adjustable in a direction substantially perpendicular to a longitudinal axis of the elongate article to apply a tension force between the strap member and the elongate article.

4. The device according to claim 2, wherein the strap member further includes:
a first aperture at the first flange, and
a second aperture at the second flange,
wherein the tensioning member extends through the first aperture and the second aperture to retain the strap member around the elongate article.

5. The device according to claim 4, wherein the strap member further includes:
a third aperture at the second flange adjacent the second aperture,
wherein the tensioning member is configured to extend through the first aperture and the third aperture to retain the strap member around the elongate article.

6. The device according to claim 4, wherein the first nut is configured to extend into the first aperture and connect to the first flange by binding to the strap member through mechanical deformation in response to a clamping force applied to the first nut.

7. The device according to claim 1, wherein the set screw member impinges on the electrical conductor to fixedly retain the electrical conductor in the second bore and to connect the tensioning member to the electrical conductor.

8. The device according to claim 1, wherein the first bore extends from the first end of the tensioning member towards the second end;
wherein the second bore extends through the head portion in a direction substantially perpendicular to the first bore.

9. The device according to claim 1, further comprising:
a second nut,
wherein the second nut is configured to thread onto the set screw member opposite the tensioning member and act upon the head portion of the tensioning member to retain a position of the set screw member in the first bore.

10. An apparatus comprising:
a strap member comprising:
a first flange,
a second flange, and
a central elongate portion;
a tensioning member comprising:
a head portion at a first end,
a first bore located in the head portion,
a second bore located in the head portion in communication with the first bore,
wherein the second bore being in communication with the first bore, and
a cylindrical portion at a second end;
a set screw member located in the first bore;
a first nut; and a second nut;

wherein the tensioning member extends through the first nut and the second end of the tensioning member is configured to contact a surface of an elongate article to electrically connect the elongate article to the tensioning member, and a position of the tensioning member in the first nut is adjustable in a direction substantially perpendicular to a longitudinal axis of the elongate article to apply a tension force between the strap member and the elongate article.

11. The apparatus according to claim 10, wherein the second bore extends through the head portion in a direction substantially perpendicular to the first bore, wherein the second bore is configured to receive an electrical conductor positioned in the second bore.

12. The apparatus according to claim 11, wherein the set screw member extends from the first bore into the second bore and impinges on the electrical conductor to fixedly retain the electrical conductor in the second bore and connect the tensioning member to the electrical conductor;

wherein the tensioning member is further configured to electrically connect the elongate article to the electrical conductor.

13. The apparatus according to claim 10, wherein the strap member further comprises:

a first aperture at the first flange, a second aperture at the second flange, and wherein the central elongate portion is configured to substantially extend around a circumference of the elongate article until the first flange is in contact with the second flange along adjacent sides, wherein the tensioning member is configured to extend through the first aperture and the second aperture to retain the strap member around the elongate article.

14. The apparatus according to claim 13, wherein the first nut is configured to extend into the first aperture and connect to the first flange by binding to the strap member through mechanical deformation in response to a clamping force applied to the first nut.

15. The apparatus according to claim 13, wherein the strap member further includes:

a third aperture at the second flange adjacent the second aperture, wherein the tensioning member is configured to extend through the first aperture and the third aperture.

16. The apparatus according to claim 10, wherein the tensioning member is further configured to apply a tension force between the strap member and the elongate article.

17. A jack bolt comprising:

a body having a first end and a second end, the body comprising:

a head portion located at the first end, the head portion comprising:

a first bore, a second bore, wherein the second bore extends through the head portion in a direction substantially perpendicular to the first bore and the second bore is in communication with the first bore, and a cylindrical portion located at the second end, wherein the cylindrical portion extends from the head portion to the second end and includes threads formed on a length of the cylindrical portion.

18. The jack bolt according to claim 17, wherein the first bore extends from the first end towards the second end in the head portion, wherein the first bore includes threads formed on an inner surface of the first bore and the first bore is configured to receive a set screw member.

19. The jack bolt according to claim 18, wherein the second bore is configured to receive an electrical conductor positioned in the second bore;

wherein the set screw member is configured to extend from the first bore into the second bore and impinge on the electrical conductor to fixedly retain the electrical conductor in the second bore and to connect the jack bolt to the electrical conductor.

20. The jack bolt according to claim 19, wherein the jack bolt comprises electrically conductive metallic material;

wherein the jack bolt comprises dimensions capable of carrying at least 2,450 amps for a predetermined period of time.

* * * * *